GUEST "C", THIOUREA, AND A SLURRY SOLVENT

CYCLOHEXANE THIOUREA AND PROPYLENE CARBONATE

United States Patent Office 3,537,983
Patented Nov. 3, 1970

3,537,983
SEPARATION PROCESSES INVOLVING
INCLUSION COMPOUNDS
Everett J. Fuller, Passaic Township, Morris County,
Robert B. Long, Atlantic Highlands, and Norvell E.
Wisdom, Jr., Elizabeth, N.J., assignors to Esso Research
and Engineering Company, a corporation of Delaware
Filed July 1, 1968, Ser. No. 741,607
Int. Cl. C07b 21/00
U.S. Cl. 208—308                                         18 Claims

ABSTRACT OF THE DISCLOSURE

Separation processes, which utilize inclusion compounds, e.g., urea adducts, clathrates, etc., and involve the formation of insoluble complexes between a suitable compound (host) and at least one constituent of a feed mixture (guest) are improved by the addition of a solvent, preferably having partial solvency for both host and guest and also permitting the formation, after complexing, of separate layers, i.e., one containing primarily feed liquor depleted in guest, the other a slurry containing the solvent and a complex of host and guest slurried therein. The process makes countercurrent separation processes involving inclusion compounds practical and can be used in the dewaxing of petroleum oils.

FIELD OF THE INVENTION

Figure 1:
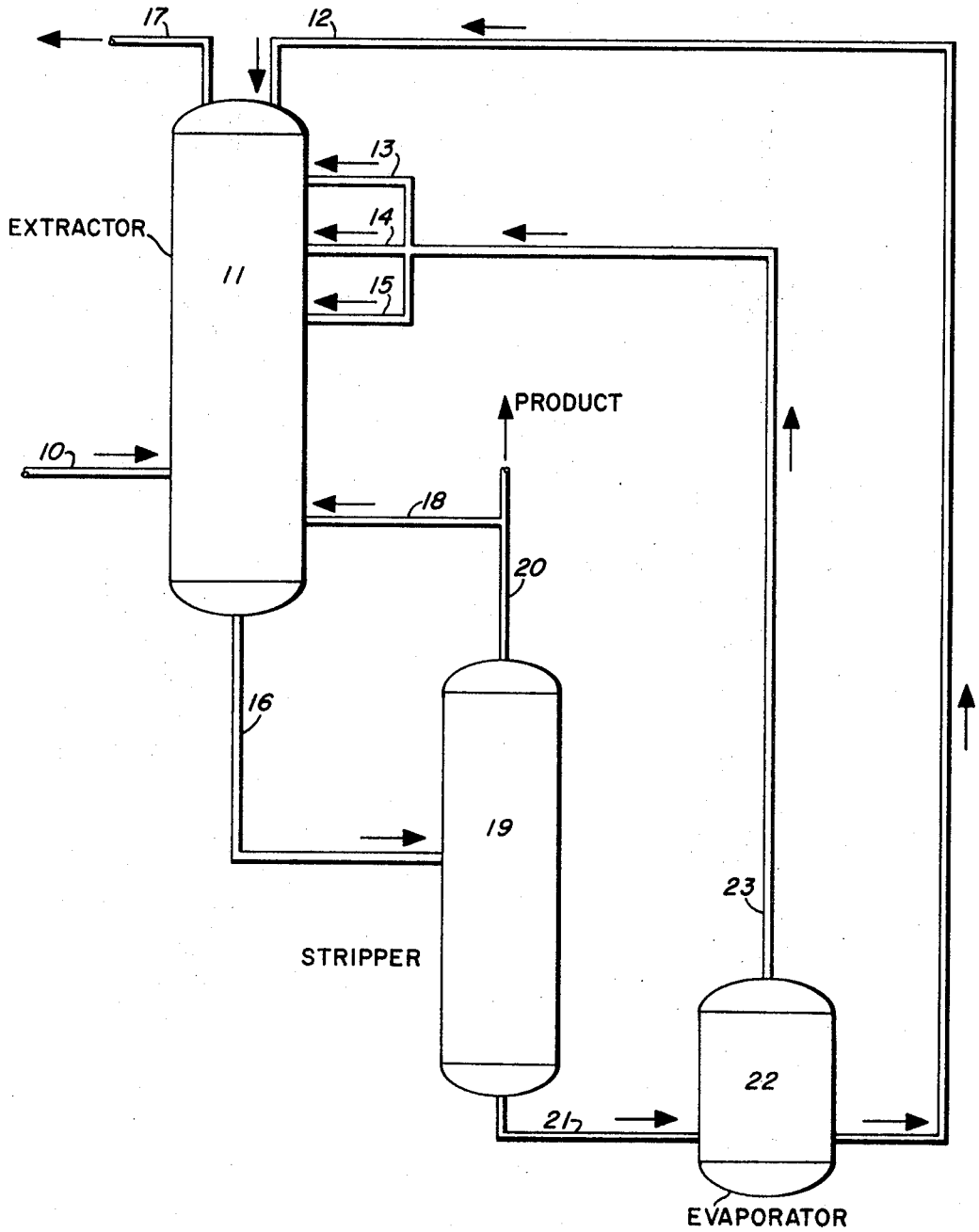

This invention relates to an improved process for the separation of feed mixtures utilizing substances forming inclusion compounds (host) to complex one or more constituents (guests) of the feed mixture. More particularly, this invention relates to a separation process wherein a solvent is provided, such solvent preferably having partial solvency for both the host compound and the guest compound or compounds which selectively complex with the host compound. Still more particularly, this invention relates to the use of a solvent which, after complexation, permits the formation of separate layers, one containing the feed liquor depleted in guest and the other being a slurry mixture containing the insoluble complex of host and guest slurried in the solvent. In a preferred embodiment hereof, countercurrent contacting is utilized to increase the degree of separation of guest from its feed liquor.

PRIOR ART

The use of inclusion compound-forming substances, such as urea, thiourea, clathrating agents, etc., for the preferential complexing of various substances has long been known, the historical development and chemical nature of such compounds being well documented in Mandelcorn, Non-Stoichiometric Compounds, Academic Press, 1964. The use of the term "non-stoichiometric" as applied to complexes formed by inclusion compound formers, i.e., hosts, and guests is rather apt since X-ray data regarding such complexes (which can also be referred to as adducts) reveal that the guest compound is trapped in channels (urea and thiourea) or cages (clathrates) formed by the continuous crystal lattice of the host compound and that such compounds do not obey the law of simple multiple proportions, i.e., the molecular ratio of host to guest is not a whole number. The stability of the complex, then, depends upon a physical relationship, i.e., fit, between the guest molecules and the channels, for example, rather than on a specific reaction between guest molecule and channel-forming compound, e.g., urea. And, it has been determined that no interaction stronger than weak van der Waals forces exist between a guest, e.g., a normal paraffin and a host, such as urea, in the absence of bond cleavage. However, it has been found that the stability of such a complex depends on a close fit of guest and host, thereby maximizing the effect of the weak dispersion forces.

Various separation processes, essentially utilizing urea, but generally applicable to thiourea, clathrates, etc., have been developed and reported in the literature. In this regard, it has been reported that dry urea will react, but rather slowly, with hydrocarbon mixtures and that the resulting adduct will be difficult to filter because of large pressure drops across the filter cake. It was then proposed to eliminate this problem by activating the dry urea with promoters, e.g., polar compounds such as water, an excellent urea solvent, or lower alcohols. Still, such processes contained severe disadvantages due to the tendency of the urea to hydrolize in the presence of water and the difficulty in separating the activator from the liquor and the adducted substance (because of similar boiling points). While several processes have been reported in the patent literature, e.g., U.S. 2,569,984, 2,693,463, 2,632,-002, 3,231,489, these processes, in the main, have employed water or have treated the adduct as a filterable solid in batch type operations. The latter factor, batch operations, has severely limited the commercial development of urea separation processes and processes involving inclusion type compounds generally. Thus, a typical continuous process involving a urea separation mentioned in the literature is reported in U.S. 2,632,002 which utilizes added solids, e.g., adsorbents such as silica gel, which entrain the adduct in a slurry phase and allow for additional adduct formation. Nevertheless, this process requires the use of water or similar hydrolyzing solvents and creates difficulties in solids separation, i.e., adduct from adsorbent. By the practice of this inventive process, however, hydrolyzing solvents and adsorbent additives are eliminated, the degree of recovery of adducted substance is increased and a true countercurrent continuous extraction process can be achieved, which closely approximates liquid-liquid extraction.

SUMMARY OF THE INVENTION

In accordance with this invention, therefore, an improved separation process involving the use of inclusion compound-forming substances (hosts) for preferentially adducting or complexing one or more separable constituents (guests) of a feed mixture is provided and comprises contacting, preferably under substantially anhydrous conditions, a host compound and a feed mixture to be separated in the presence of substance preferably having at least a partial solvency for both the host compound and a separable feed constituent (guest), which solvent, after complexation of guest and host, permits the formation of two separate liquid phases in equilibrium with the complex, i.e., one liquid phase comprising the liquor depleted in separable constituent, the other in a slurry mixture comprising the insoluble complex of guest and host, solvent, and dissolved substances, which dissolved substances may include a portion of the separable constituent. Now, since the slurry mixture is easily pumpable, a countercurrent extraction system involving contacting of the slurry mixture and liquor phase can be achieved.

While not wishing to be bound by any particular theory, it is believed that the interaction between the host compound and the separable constituent of the feed is a liquid-liquid interaction, i.e., the host compound and separable feed constituent are present as dissolved substances in a compatible medium. Hence, the preferred use of a solvent that has at least partial solvency for both the host and guest compounds. Of course, however, this invention contemplates the use of a solvent which at the outset may be only very slightly miscible with either host or guest compounds, but after vigorous stirring and/or elongated reaction periods, e.g., the reaction of solid urea with normal hydrocarbons is quite slow, the solvent will meet the critical test of forming two liquid phases as described herein. For example, the following table shows several satisfactory solvents for use herein which at equilibrium are substantially immiscible with feed or host.

TABLE I.—LOW SOLUBILITY SYSTEMS

| Solvent | Host | Solubility for host, wt. percent | Solubility for feed,[1] wt. percent |
|---|---|---|---|
| Propylene carbonate | Thiourea or urea | ~1 | ~4–5 |
| Ethylene glycol | do | 20–30 | ~1 |
| N-methylpyrrolidone | do | 5 | ~15–20 |

[1] Feed is that which can be normally used in urea or thiourea separations.

Nevertheless, in a solvent in which both host and guest can dissolve an equilibrium would normally develop based upon the amount of host and guest that can dissolve in a particular solvent under specified conditions, absent other factors. However, since host and guest are, by definition, compounds that will have an affinity for each other and will complex and precipitate, the equilibrium will continuously shift to the right allowing more host and more guest to dissolve, thereby repeating the complexing and precipitating reactions. It is apparent then that the process can be continued, if enough solvent and host are available, until the entire system is equilibrated, at which time the amount of guest compound in the depleted feed mixture depends on the complex stability. And, because a relatively easily handled slurry mixture is produced, a liquid-liquid countercurrent process can be approximated. Moreover, in such a process the guest compound, the separable feed constituent, is contained in the entire slurry mixture, i.e., as adduct and dissolved in the solvent. Thus, the prior art processes used to filter and decompose the adduct product, recovery being limited to that which was recovered from the adduct. However, in the instant process, the entire slurry mixture contains product and the amount of guest dissolved in the solvent but unadducted can also be recovered, e.g., by distillation, and added to guest recovered from the adduct to increase the overall product recovery.

Now, moving in the other direction, this invention also contemplates for use as solvent a substance which initially is wholly miscible with the guest compound, e.g., Carbitol, whose proper name is 2-(2-ethoxy ethoxy)ethanol, is wholly miscible with cyclohexane in a feed mixture of cyclohexane and n-heptane but will also allow a separate slurry mixture to form when contacted with thiourea, i.e., thiourea adducts with cyclohexane to form an insoluble adduct, and forms a slurry mixture in Carbitol while the n-heptane remains substantially a separate liquid phase.

The solvents which may be employed herein are critical to the success of the inventive process. Thus, these solvents must possess certain functional qualities, the most important of which is the ability to promote the formation of two liquid phases and a solid phase at equilibrium. Additionally, the solvent should be nonreactive or only slightly reactive, i.e., relatively inert, to the host compound, and the solvent should preferably promote complexing. This last factor is somewhat tied in with the ability of the solvent to dissolve host and/or guest. Thus, the solvent may be wholly miscible, or substantially immiscible with feed and/or host initially, so long as the other listed criteria are met. These general conditions are applicable regardless of the type of inclusion-forming compound selected for use as host herein. Nevertheless, for urea and thiourea, the most highly developed and most commercially investigated formers of inclusion compounds, some additional solvent characterizations can be made. In this regard, urea and thiourea complexing agents can be satisfactorily employed with polar solvents, preferably ether alcohols and polyols. Ether alcohols applicable to this invention can be represented by the generic formula R—O—R'—OH wherein R may be an alkyl or alkoxy radical and R' may be an alkylene radical, the only requirement being that ether alcohol is liquid at operating temperatures, e.g., up to about 9 carbon atoms. Examples of such compounds are 2-methoxyethanol, 2-(2-ethoxy ethoxy)ethanol, and the like. The polyols applicable herein are preferably of a relatively low molecular weight and contain from about 2 to about 6 carbon atoms, e.g., diethylene glycol, ethylene glycol, glycerol, acetic acid esters of glycerol, e.g., monoacetin. Additionally, compounds such as furfuryl alcohol, n-methyl pyrrolidone, propylene carbonate, 1-piperazine ethanol, 2-chloroethanol, mixtures containing a minor proportion of ethylene glycol and a major proportion of 2-ethoxyethanol, e.g., 25%/75%, and mixtures containing a major proportion of 2-methoxyethanol and a minor proportion of 2-ethoxyethylacetate, e.g., 75%/25%, can be used as solvents. Of the mixtures, it is interesting to note that the second substance of each mixture cannot be used alone. Additionally, furfuryl alcohol, although useful herein, is relatively unstable and is present with its oxidation products while propylene carbonate, also useful herein, tends to pyrolyze when subjected to distillation and these solvents are less preferred. A highly preferred solvent is 2-methoxyethanol which readily promotes adduct and slurry formation.

Urea and thiourea have known selectivity for various hydrocarbons. For example, urea will complex selectively with normal aliphatic hydrocarbons having at least 6 carbon atoms, terminal substituted normal aliphatic hydrocarbons containing at least 6 carbon atoms in an unbranched chain, e.g., n-decanol, n-dodecyl benzene, and some methyl substituted n-aliphatic hydrocarbons. Thiourea selectively complexes with branched chain hydrocarbons and some naphthenes, e.g., triptane, 2,3-dimethylbutane, cyclopentane, cyclohexane, and the like.

The discovery of the complex-forming ability of urea and thiourea provides a very useful tool in the resolution of organic mixtures such as petroleum fractions. Urea complexing is particularly useful in the isolation of specific compounds and in the removal of undesirable components from petroleum fractions. Dewaxing of petroleum fractions such as gas oils and lubricating oils to produce low wax content products illustrates the use of urea complexing to free a petroleum fraction of undesirable constituents. The main commercial usefulness of urea complexing at the present time lies in the dewaxing of gas oils and lubricating oil fractions; low pour diesel fuel is in demand as a jet fuel and for cold weather operation of diesel engines; refrigerator oils characterized by low pour and Freon haze tests are required in air conditioning and refrigeration equipment. For example, $C_6$–$C_{12}$ naphthas are used as reforming feed stocks for fuels. However, such stocks contain many linear paraffins which crack to coke and gas during reforming. Urea can be successfully employed to selectively remove these linear paraffins from the naphtha prior to reforming.

Reaction conditions for conducting any of the various types of complexing contemplated herein will, of course, vary widely with the system utilized. Generally, however, there are no critical limitations and it is only necessary that the system be a liquid-liquid (slurry) system, i.e., none of the constituents freeze and the complexing agent and adduct are stable. For example, in urea and thiourea systems temperatures can normally range from about −50° C. to about +180° C., preferably about −10° C. to about 100° C. Below −50° C., the components begin to solidify, solutions become more viscous thereby inhibiting pumping, and equilibrium solubilities are lowered. Above about 180° C., however, thiourea melts and its adducts are generally unstable (urea melts at 132° C.). While exceptions are known, adduct stability generally tends to increase with decreasing temperatures. Similarly, pressures are not critical and the processes may be conducted at subatmospheric pressures, e.g., 0.1 atmosphere as well as superatmospheric pressure, e.g., 50 atmospheres. Atmospheric pressure is normally convenient for most processes. Reaction periods will, of course, vary widely, are not critical, and are often preferably of a duration sufficient to establish equilibrium in the system. (In continuous countercurrent operations, the slurry mixture should equilibrate with the other liquid phase at each stage of the process.) Adduction periods for urea and thiourea, for example, can normally range from about a few seconds, e.g., 3–10 seconds, to 8 hours or more, preferably less than about 30 minutes.

The quantity of solvent employed is that quantity which will be sufficient to allow the formation of a two-phase system and will generally range, on a volume basis, from about 1/10 to 10/1 in parts solvent/part adducting substance, i.e., host. Some typical ratios for urea with various solvents are shown below in Table II.

TABLE II.—VOL. SOLVENT/WT., CC./G., UREA FOR SEPARATE SLURRY PHASE

| Solvent | Broad range | Preferred range |
| --- | --- | --- |
| 2-methoxyethanol | 1/5–10/1 | 1/4–5/1 |
| Ethylene glycol | 1/10–10/1 | 1/5–5/1 |
| 2-(2-ethoxy ethoxy)ethanol | 1/4–4/1 | 1/2–2/1 |
| Furfuryl alcohol | 1/4–10/1 | 1/4–5/1 |

And, the amount of urea and thiourea in relation to separable feed constituent ranges from about 1 to 3.5 parts urea by weight per part separable constituent and from about 1.5 to 3 parts thiourea by weight per part separable constituent. Nevertheless, these amounts may vary upwardly or downwardly by the very nature of adduction, i.e., the adduct is a nonstoichiometric compound held together by weak, nonspecific forces between the adducted molecule and the inside of the channel (cage) wall, no small number ratios, i.e., simple whole numbers, need exist, and, therefore, weight ratios depend on the sizes and shapes of the guest molecules, in relation to the structure of the host lattice, as well as the density of the guest molecules. For example, one gram of cyclohexane requires 2.7 grams of thiourea for complexing and one gram of n-dodecane requires 3.3 grams of urea for complexing. However, one skilled in the art, after relatively little and routine experimentation, will be able to determine optimum weight ratios for any desired separation using any desired complexing substance.

When the desired degree of complexation (adduction) has been effected, either in batch or staged operations, the slurry mixture can be readily removed from the depleted feed liquor phase, e.g., by decanting, and recycled to another adduction stage or the product recovered from said mixture, e.g., by distillation, extraction, by heat decomposition of the adduct followed by distillation or solvent stripping followed by distillation, etc. Prior to product recovery from the adduct, the slurry mixture can be washed to remove liquor or undesired feed constituents to as great a degree as desirable or necessary for transfer to succeeding stages or for product recovery. For example, thiourea adducts can be washed with a normal paraffin, e.g., n-heptane, and urea adducts can be washed with branched paraffins, e.g., 2,2,3 - trimethylpentane. Alternatively, the washing may be done with product, i.e., guest, displace contaminants from the slurry mixture.

PREFERRED EMBODIMENT

In a preferred embodiment of this invention, a countercurrent contacting process, akin to liquid-liquid extraction, except that one phase is a slurry mixture, can be made commercially and economically attractive. For example, a cyclohexane-n-heptane system wherein thiourea is utilized to extract the cyclohexane will be discussed for illustrative purposes. The feed, e.g., cyclohexane and n-heptane, is introduced into a multistage extractor so as to flow countercurrently against, and be mixed with, a mixture of thiourea and solvent.

Turning now to FIG. 1, attached hereto, a better understanding of the instant invention may be had. Fresh hydrocarbon feed, e.g., n-heptane, cyclohexane, is introduced by line 10 into a multistage, i.e., more than one stage, extractor 11. Thiourea mixed with 2-methoxyethanol is added as a slurry or a solution to the extractor 11 by line 12. Now, if a fixed ratio of thiourea to solvent was employed throughout the adduction process, the amount of solvent necessary at the product-rich end of the multistage extractor, where there is a thin adduct for moving through the equipment, would also be fixed. However, adducts are generally rather insoluble relative to the uncomplexed complexing agent (host) and, therefore, a greater amount of solvent may be required at the product-rich end of the extractor, to move the product slurry, relative to the uncomplexed thiourea at the feed point. Consequently, additional solvent addiitons, after adduction has begun, are made via lines 13, 14 and 15, it being understood that more, less, or no additional solvent may be required for individual cases. Thus, as adduct increases towards the bottom of extractor 11 and is withdrawn with solvent by line 16, sufficient solvent is available to allow easy handling of the slurry. Depleted feed liquor, e.g., n-heptane is withdrawn by line 17 and discarded from the process while recycle slury, i.e., thiourea plus 2-methoxyethanol is introduced via line 12. As previously mentioned, a wash liquid can be utilized to remove undesired components from the slurry and is added to the extractor by line 18 and can be the product, e.g., cyclohexane. The adduct and slurry solvent in line 16 is then transferred to stripper 19 where the adduct is stripped, e.g., by heating to about 100° C., the cyclohexane product being removed by line 20, a portion being recycled to the extractor by line 18 as wash liquid. Decomplexed thiourea and excess solvent are taken from stripper 19 by line 21 and transferred to flash evaporator 22 where excess solvent is removed via line 23 for recycle to the extractor and a thiourea-solvent slurry is recycled to the extractor by line 12. According to the amount of solvent removed in evaporator 22, the thiourea recycle may be a slurry or a saturated solution of host in solvent. It should also be remembered that the 2-methoxyethanol will also contain some dissolved cyclohexane which can be removed by distillation in combination with adduct decomposition in stripper 22.

Generally, the slurry phase contains only enough solids to allow easy handling e.g., 5 to 60 wt. percent solids, preferably 20 to 40 wt. percent. These ranges, however, can be obtained by the addition of more solvent during countercurrent extraction, if the solids concentration becomes excessive, i.e., not readily pumpable.

The interactions occurring in a typical stage of the countercurrent system are as follows:

(1) Slurry of solid thiourea adduct and a solution of thiourea in 2-methoxyethanol moves down from the stage above.

(2) Liquor from the stage below rises into the stage under consideration.

(3) The slurry and liquor are mixed, and equilibrium is substantially attained between all components and all phases. This means that more adduct is made, depleting the amount of dissolved thiourea in the slurry, and also depleting the amount of cyclohexane in the liquor.

(4) The mixed phases are allowed to settle until the liquor has separated from slurry.

(5) Liquor moves up into the stage above, and slurry moves down into the stage below.

The top stage will mix nearly depleted liquor with slurry containing no adduct. The stage at the feed point (line 10 in FIG. 1) will mix substantially fully loaded slurry with raw feed.

Figure 2:
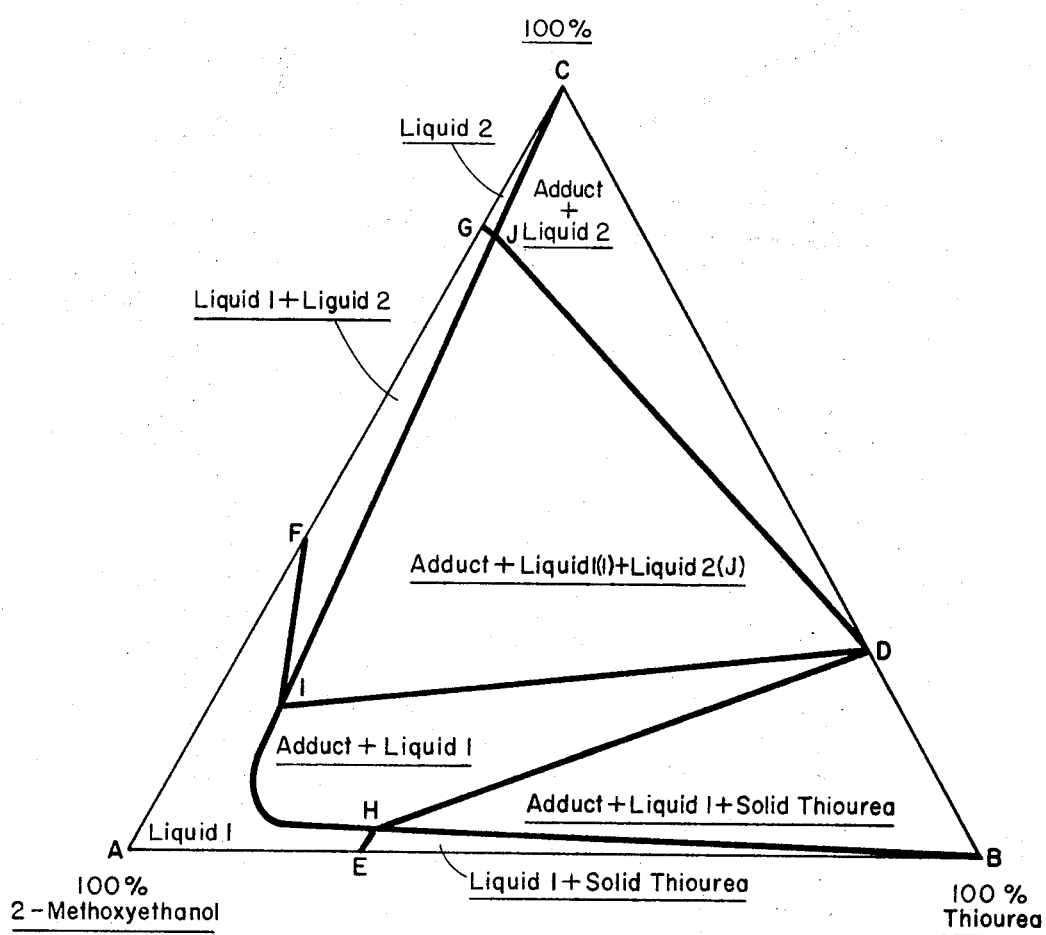
Figure 3:
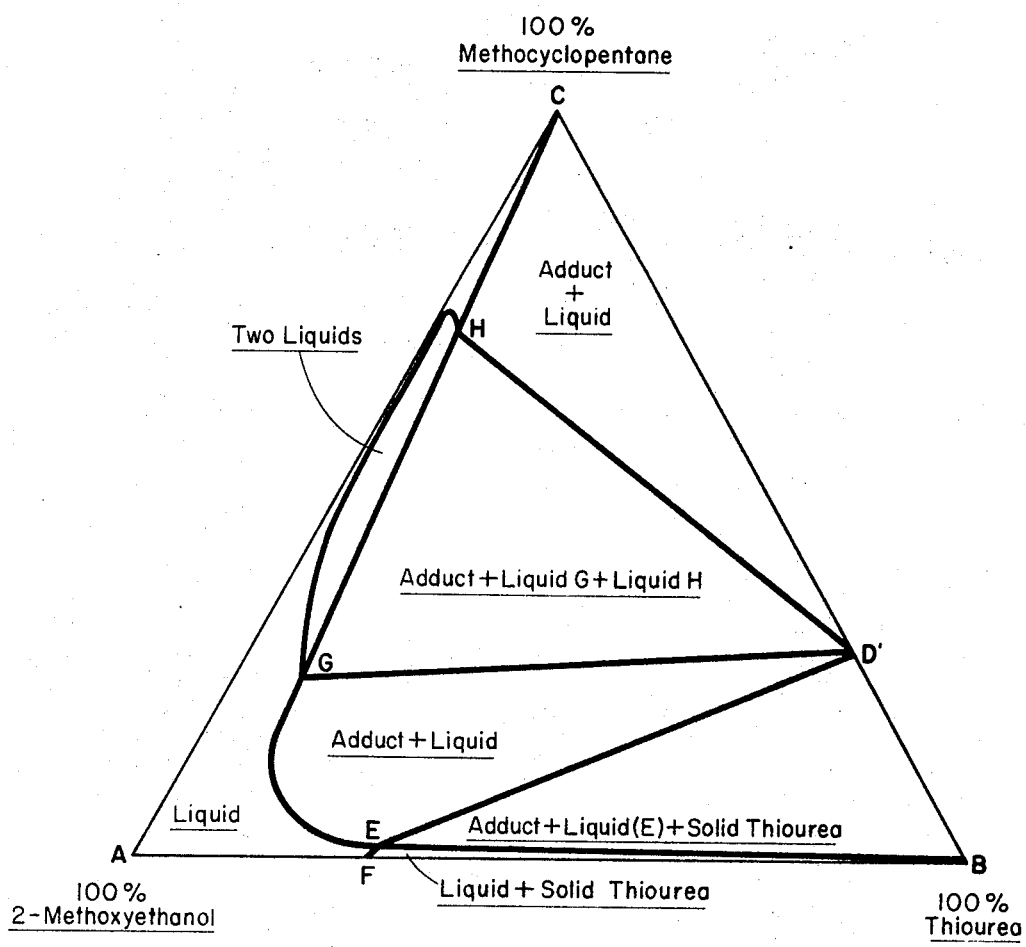
Figure 4:
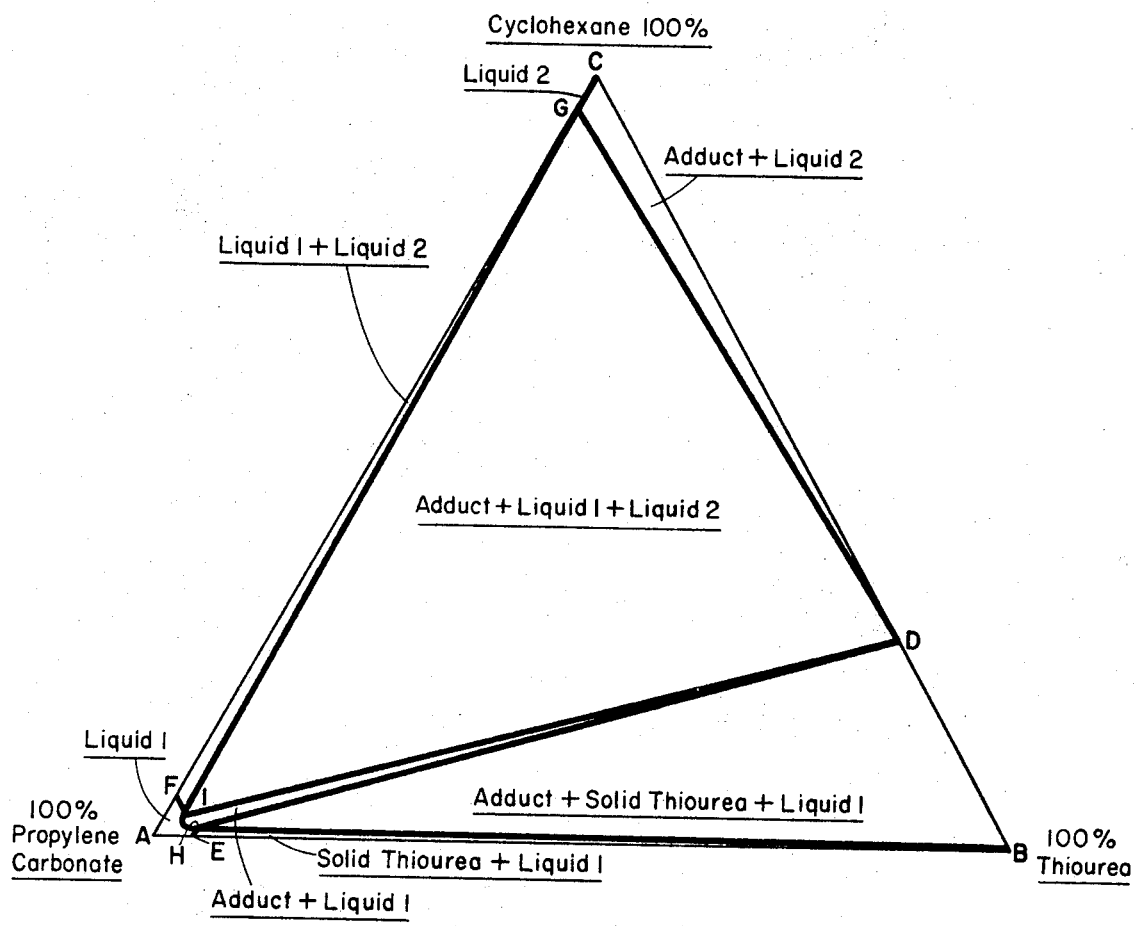

FIGS. 2, 3, and 4 are triangular phase diagrams showing the phase behavior of three different ternary systems. All three systems lead to the proper phase relationships needed for separations as described in this invention, i.e., solid in equilibrium with two liquid phases, one of which being readily decanted from a slurry of solid in the other.

FIG. 2 shows partial miscibility of solvent 2-methoxyethanol with guest "C," represented by the two points F and G along line AC. Here F is the composition of a saturated solution of C in 2-methoxyethanol, and G is the composition of a saturated solution of 2-methoxyethanol in C. Any point on line FG represents a mixture of two liquid phases of varying amounts but of compositions F and G. Now, as thiourea is added to the system, the composition must be represented by a point on the interior of the diagram. Inside the area DIJ, solid adduct of composition D exists in equilibrium with liquid of composition I and liquid of composition J. The slurry mixture for this system will consist of adduct and liquid 1.

The system shown in FIG. 3 differs mainly from that of FIG. 2 in that guest (methylcyclopentane) and solvent are compeltely miscible in the absence of thiourea. Inside the region D'GH, however, we again have adduct of composition D' in equilibrium with liquids of composition G and H.

The case of very low solubility of guest or host in solvent is shown in FIG. 4. As in FIG. 2, F' and G' represent the low solubilities of guest in solvent and solvent in guest, respectively. Thiourea is also nearly insoluble in the solvent propylene carbonate, as shown by the position of point E. Over most of the entire range of compositions in this ternary system, then, the slurry of adduct D mixed with liquid 1 is in equilibrium with liquid 2, of approximate composition G'.

In certain instances, it may be desirable to perform a separation involving inclusion-forming compounds utilizing only one stage of operaiion, i.e. wherein the feed mixture is mixed with slurry of complexing agent and solvent instead of with slurry which has previously been equilibrated with partially depleted feed mixture over several stages. An example would be a facile separation where one operating stage would suffice to produce the products desired. Examination of FIG. 2 shows that the solubility of guest "C" in solvent, e.g., 2-methoxyethanol, is strongly decreased by the addition of thiourea, along the line FI. Now, it is possible to obtain more or less adduct for a given mixture of guest "C," e.g., n-heptane, thiourea, and 2-methoxyethanol depending upon how the components are mixed, if the entire system is not equilibrated. Separately mixing feed with solvent, then combining with separately mixed thiourea and solvent in a later step might be expected to insure that the first step could be removal of guest from solution as adduct, not as undissolved guest. Such a result was realized as described in Example 5, hereinbelow.

If insufficient time for establishment of equilibrium is allowed in a single stage separation utilizing this invention, advantage may be taken of differences in the degree of "salting-out" of various feed constitutents by dissolving the complexing agent in the slurry solvent to produce an improved separation. In Example 6 hereinbelow, an improved separation was observed, i.e., the ratio of octane to cyclohexane was greater, when a mixture of feed and solvent was combined with a slurry of urea.

In addition to urea and thiourea, various other complexing agents can be employed in similar processes, the complexes formed being generally referred to as inclusion compounds. Typical examples of host compounds and their respective guests are shown in Table III.

TABLE III

| Host: | Example guest [1] |
|---|---|
| Urea | n-p, n-f, n-derivatives. |
| Thiourea | iso-p, naph, n-p above $C_{16}$. |
| Desoxycholic acid | n-p, n-f, arom. |
| 4,4'-dinitrodiphenyl | n-p, diphenyls. |
| Tri-o-thymotide | n-p, naph, iso-p. |
| α-Cyclodextrin | n-p, n-f. |
| β-Cyclodextrin | n-p, n-f, benzoic acid. |
| γ-Cyclodextrin | Arom. |
| Amylose starch | n-f, $I_2$. |
| 4,4'-dihydroxytriphenylmethane | n-p, iso-p. |
| Triphenylmethane | n-p, iso-p. |
| Methylnaphthalene | n-p to $C_{16}$, iso-p. |
| Spirochromans | n-p, iso-p |
| Cellulose | n-p, $I_2$. |

[1] n-p = n-paraffins; n-f = n-fatty acid or alcohol; iso-p = isoparaffin; naph = naphthalene; arom = aromatic molecules or compounds.

Other suitable complexing agents, e.g., clathrates, chelating agents, etc., which can act as hosts to form adducts can be found in "Non-Stoichiometric Compounds," supra. Additionally, an excellent treatise on clathrate compounds, their formation, uses and limitations can be found in the book by Sister Martinette Hagan, Clathrate Inclusion Compounds, Reinhold (1962) which is incorporated herein by reference.

Having now described the invention, the following examples will further serve to illustrate the process. However, no limitations are to be implied from these examples since variations will be obvious to those skilled in the art.

EXAMPLE 1

To show the effects of 2-methoxyethanol, 1.0 gram thiourea was added to 10.0 ml. of 10 vol. percent cyclohexane in n-heptane at 25° C. in each of two flasks, I and J, with results as follows:

| Sample Number: | 2-methoxyethanol | Percent adduction in 15 min. |
|---|---|---|
| I | 0.3 ml | 41 |
| J | None | [1] 0 |

[1] No detectable adduction until after 4½ hours; 27% adduction in 5½ hours.

EXAMPLE 2

The slurry of 2-methoxyethanol with adduct may be freed of liquor in most cases by pouring off the top liquid phase. The slurry is compact and viscous enough to reject most of this liquor. It is conveniently freed of dissolved but not adducted substances by rinsing with a neutral liquid. For example, a solution approximating hydroisomerized light naphtha was prepared and treated with thiourea-2-methoxyethanol.

| Feed: | Vol. percent |
|---|---|
| 2,2-dimethylbutane (DMB) | 23 |
| 2,3-dimethylbutane (DMB) | 5 |
| n-Hexane | 62 |
| Cyclohexane | 10 |

5.0 grams thiourea, 5.0 ml. 2-methoxyethanol, and 16 ml. feed were mixed for 15 minutes. The liquor was poured off, the slurry was shaken with 10 ml. of n-heptane, settled, and the heptane layer was discarded to remove unadducted feed components. The slurry layer was then analyzed by distilling volatiles off, washing out 2-methoxyethanol with water, and then employing gas-liquid chromatography to examine the water-insoluble oil.

| Sample | Analysis, volume percent | | | |
|---|---|---|---|---|
| | 2,2-DMB | 2,3-DMB | n-Hexane | Cyclohexane |
| Liquor | 18.2 | 4.28 | 71.6 | 5.85 |
| C₇ free distillate | 31.3 | 6.4 | 12.2 | 50.0 |

It is seen that considerable enrichment of 2,2-dimethylbutane and cyclohexane was achieved in one treatment with the slurry.

EXAMPLE 3

A fraction of light virgin naphtha, boiling range 65° C.–100° C., was treated as in Example 2.

| Sample | Wt. percent cyclohexane | Wt. percent methylcyclopentane | Wt. percent n-heptane |
|---|---|---|---|
| Feed | 6.8 | 8.8 | 11.9 |
| Liquor | 3.23 | 7.04 | 15.3 |
| Distillate (adduct dried 5 min., not washed) | 22.05 | 14.5 | 7.27 |
| Distillate (adduct dried 15 min., not washed) | 27.7 | 16.8 | 3.59 |
| Distillate (adduct washed once with n-pentane; results on a C₅ free basis) | 32.7 | 19.6 | 2.11 |

VPC analysis of the liquors detected no 2-methoxyethanol in any case. It remains largely with the adduct in the slurry mixture. Methanol, when used as a solvent in the same system, remained with the depleted feed, and left adduct in a finely divided and fluffy state.

Use of water to obtain granular adducts with urea is known. However, the hydrolysis of urea or thiourea is a complication, particularly if the adduct is heated to effect product recovery. No reaction of the solvent 2-methoxyethanol would be expected under normal conditions.

EXAMPLE 4

3.3 grams thiourea, 10 grams solvent, and 10 ml. feed mixture were mixed for 15 minutes at 25° C. The adduct was recovered, washed with n-heptane, decomposed and the organic layer analyzed. The feed mixtures are shown in Table IV and results for various solvent shown in Table V.

TABLE IV

Feed mixture: Vol percent
- 2,2-dimethylbutane (2,2-DMB) _____ 1.4
- 2,3-dimethylbutane (2,3-DMB) _____ 2.9
- 3-methylpentane (2 MP) _____ 25.9
- n-Hexane (n-C₆) _____ 31.4
- Methylcyclopentane (MCP) _____ 15.5
- Cyclohexane (cyc. C₆) _____ 22.9

All solvents used formed a slurry mixture with depleted liquor also in a separate phase.

TABLE V

| Slurry solvent | Volume percent in adducted liquid | | | | | |
|---|---|---|---|---|---|---|
| | 2,2-DMB | 2,3-DMB | 3MP | n-C₆ | MCP | Cyc-C |
| Propylene carbonate | 2.09 | 3.75 | 11.1 | 4.90 | 22.1 | 56.2 |
| 25% 2-ethoxyethylacetate, 75% 2-methoxyethanol | 2.00 | 3.21 | 8.67 | 3.90 | 19.3 | 63.0 |
| 25% Ethylene glycol, 75% 2-ethoxyethanol | 1.66 | 2.83 | 9.53 | 5.60 | 19.7 | 60.7 |
| N-methyl pyrrolidone | 1.16 | 2.5 | 21.8 | 24.9 | 19.0 | 30.6 |
| Diethylene glycol | 1.33 | 2.68 | 12.9 | 11.3 | 19.6 | 52.3 |
| Ethylene glycol | 1.75 | 3.16 | 10.9 | 6.32 | 21.5 | 56.5 |
| Furfuryl alcohol | 1.78 | 3.28 | 14.0 | 10.3 | 21.6 | 49.1 |
| 2-methoxyethanol | 1.46 | 2.72 | 9.65 | 6.57 | 19.4 | 60.4 |
| 2-chloroethanol | 1.88 | 3.28 | 10.5 | 6.13 | 20.7 | 57.6 |
| Monoacetin | 1.53 | 3.18 | 15.5 | 11.4 | 21.8 | 46.7 |

Furfuryl alcohol is less preferred than the other solvents mentioned because it oxidizes readily in air to tarry products from which it is difficult to remove hydrocarbons, and which would contaminate products sought. The 2-methoxyethanol, however, is highly preferred since it readily promotes adduct formation upon contacting and mixing is facilitated.

EXAMPLE 5

This example illustrates the increased recovery that can be obtained by separately dissolving feed and complexing agent in the solvent. A feed mixture of 10 ml. n-heptanecyclohexane containing 10% by volume of cyclohexane was mixed with 6.59 grams thiourea and 11.6 ml. of 2-methoxyethanol for 15 minutes. After mixing the liquor layer was separated from slurry layer and each layer was analyzed for cyclohexane product. The top layer, mainly depleted feed liquor, contained 0.393 ml. cyclohexane and the bottom layer, slurry, contained a total of 0.607 ml. cyclohexane (in the adduct and dissolved in the solvent). In another run using the same feed composition, 10 ml. of feed was separately mixed with 5.0 ml. of solvent while 6.59 grams of thiourea was separately mixed with 5.0 ml. solvent. The two mixtures were then contacted and mixed for 15 minutes, after which the same phase separations occurred. Analysis for cyclohexane showed 0.275 ml. in the top layer and 0.725 ml. in the bottom layer, or an increased recovery of about 20%.

EXAMPLE 6

It has been found that if A (a separable feed constituent) is more soluble in mixtures of B (an inclusion forming compound) and C (solvent) than other feed mixture components, then better adductate is made by adding pure feed to a mixture of B and C, and mixing to produce adduct.

Also, if A is less soluble in mixtures of B and C than other feed components, better adductate is made by first mixing feed and C, then mixing B and C, and finally combining the two mixtures to produce adduct.

For example, the solubilities of cyclohexane and n-heptane in 2-methoxyethanol-thiourea mixtures were shown to decrease as the amount of thiourea added increased:

| Conditions | Grams thiourea added | Cyclohexane in bottom layer, ml. | n-Heptane in bottom layer, ml. |
|---|---|---|---|
| 10 ml. of 10 vol. percent cyclohexane is heptane, 10 ml. of 2-methoxy ethanol solvent, 25° C., mixed 15 minutes, no adduct formed | 1 | 0.53 | 3.92 |
| | 2 | 0.32 | 1.77 |

Although the amounts of both cyclohexane and heptane in the solvent layer decreased markedly as thiourea was added, it is evident that cyclohexane is more soluble in the system at all points.

According to this embodiment, a better separation of cyclohexane by adduct formation with thiourea results from mixing feed, thiourea, and 2-methoxyethanol simultaneously, than from combining a mixture of feed and 2-methoxyethanol with a mixture of thiourea and 2-methoxyethanol and results are shown below.

Procedure: 1. Prepare mixture of 6.59 thiourea and 6.5 ml. of 2-methoxyethanol. To this add a mixture of 5 ml. 2-methoxyethanol and 10 ml. of 10% cyclohexane in heptane. Mix 15 minutes at 25° C.; Analysis of thiourea free adductate: 77.3% heptane, 22.8% cyclohexane.

Procedure: 2. Mix 6.59 g. thiourea 11.6 ml. 2-methoxyethanol, and 10.0 ml. 10% cyclohexane for 15 minutes at 25° C.; Analysis of thiourea-free adductate: 64.6% heptane, 35.5% cyclohexane.

Also, in this embodiment combining a mixture of octane feed and 2-methoxyethanol with a mixture of urea and 2-methoxyethanol produces adduct with octane relatively enriched over cyclohexane, compared with the case of simultaneous mixing.

In the urea system, octane adducts, and cyclohexane is nonadducting.

Procedure: 1. Prepare a mixture of 5.0 g. urea and 6.0 ml. 2-methoxyethanol; mix 15 minutes at ~12° C. with a mixture of 10 ml. of 40 vol. percent n-octane in cyclohexane and 5.0 ml. 2-methoxyethanol; Analysis of urea-free adductate: 47.2% cyclohexane, 52.8% n-octane.

Procedure: 2. Mix 5.0 g. urea, 11.0 ml. 2-methoxyethanol, and 10 ml. 40% octane for 15 minutes at ~12° C.; Analysis of urea-free adductate: 50.7% cyclohexane, 49.3% n-octane.

EXAMPLE 7

FIGS. 2 and 3 show that the liquor which is separated from a slurry of adduct and solution may differ widely in composition from one guest to another. Thus, point J in FIG. 2 corresponds to about 81% guest "C" but point H in FIG. 3 represents about 70% guest "C." Such differences in behavior of a solvent toward components of a feed mixture form the basis for solvent extraction separation processes. In the systems under consideration, solvent extraction will combine with adduct formation to produce separations which may not otherwise be attainable. Aromatic hydrocarbons, e.g., $C_6$-$C_{12}$ aromatics, are, in general, quite soluble in 2-methoxyethanol relative to other hydrocarbons; this indicates that mixtures containing aromatics might be treated with thiourea slurry to concentrate not only cycloparaffins which may form adducts with thiourea, but also aromatics. This was shown to be the case by mixing 5 g. thiourea, 11 ml. 2-methoxyethanol, and 10 ml. of a light boiling virgin naphtha, i.e., up to about $C_{12}$, for 15 minutes, and then analyzing the two phases:

| Substance | Volume Percent | | | Extract washed twice |
| --- | --- | --- | --- | --- |
|  | Feed | Extracted Oil | Liquor |  |
| n- and iso-parafins | 44.8 | 30.8 | 50.1 | 22.6 |
| Cycloparaffins | 37.5 | 45.0 | 35.9 | 62.6 |
| Aromatics | 16.2 | 34.6 | 32.3 | 13.9 |

The separation process is therefore made more versatile than straightforward adduction or slurry adduction with an indifferent solvent by concentrating in the adduct-containing phase substances such as aromatics, which do not form adducts with thiourea as a rule. (The naphtha did not contain the aromatic hydrocarbon durene, which does adduct.)

That the extracted aromatics were mainly in the solution part of the bottom layer and not in the solid adduct formed is shown by the column on the right of the table. The slurry was washed twice with n-pentane, which removes most of the oil dissolved in solution but leaves behind the solid adduct made in the initial mixing.

What is claimed is:

1. A process for the selective separation of compounds selected from the group consisting of normal paraffins, isoparaffins and naphthenes contained in a liquid hydrocarbon mixture, said mixture also comprising aromatics which comprises continuously countercurrently contacting said hydrocarbon mixture with a slurry of a substance selected from the group consisting of urea and thiourea under substantially anhydrous conditions, said substance being capable of forming an adduct with said compounds, and a liquid solvent, said solvent being selected from the group consisting of ether alcohols, polyols, furfuryl alcohol, n-methyl pyrrolidone, piperylene carbonate, i-piperazine ethanol and 2-chloroethanol for a maximum period of 30 minutes whereby an equilibrium is established and the solvent extracts at least a portion of the aromatics from the hydrocarbon feedstream, said solvent being capable of promoting the formation of two liquid phases in equilibrium with the adduct, one liquid phase comprising feed mixture depleted in said compounds and the other liquid phase comprising the solvent associated with the adduct and extracted aromatics as a slurry and forming the adduct in equilibrium with the two liquid phases.

2. The process of claim 1 wherein a portion of the separable feed constituent is contained in the solvent phase.

3. The process of claim 1 wherein the solvent is substantially miscible with the feed.

4. The process of claim 1 wherein the solvent is substantially immiscible with the feed.

5. The process of claim 1 wherein prior to the contacting of feed mixture, substance capable of forming an inclusion compound, and the inert solvent, the feed mixture is mixed with solvent in a separate step, and the inclusion forming compound is mixed with solvent in a separate step.

6. The process of claim 1 wherein the separable feed constituent is more soluble than the remaining feed mixture constituents in a mixture of substance capable of forming an inclusion compound and solvent and the feed mixture, substance capable of forming an inclusion compound, and solvent are contacted simultaneously.

7. The process of claim 1 wherein the separable feed constituent is less soluble than the remaining feed mixture constituents in a mixture of substance capable of forming an inclusion compound and solvent, prior to contacting of feed mixture, substance capable of forming an inclusion compound, and solvent, the feed mixture is mixed with solvent in a separate step and the substance capable of forming an inclusion compound is mixed with solvent in a separate step.

8. The process of claim 1 wherein the solvent is selected from the group consisting of liquid ether alcohols having the generic formula R—O—R′—OH, wherein R is selected from the group consisting of alkyl and alkoxy radicals and R′ is an alkylene radical and polyols having from 2 to about 6 carbon atoms.

9. The process of claim 1 wherein the solvent is 2-methoxyethanol.

10. The process of claim 1 wherein the solvent is propylene carbonate.

11. The process of claim 1 wherein the solvent is n-methyl pyrrolidone.

12. The process of claim 1 wherein the solvent is diethylene glycol.

13. The process of claim 1 wherein the solvent is ethylene glycol.

14. The process of claim 1 wherein the solvent is 2-chloroethanol.

15. The process of claim 1 wherein the solvent is monoacetin.

16. The process of claim 1 wherein the solvent is a mixture of a minor proportion of 2-ethoxyethylacetate and a major proportion of 2-methoxyethanol.

17. The process of claim 1 wherein the solvent is a mixture of a major proportion of 2-ethoxyethanol and a minor proportion of ethylene glycol.

18. The process of claim 1 wherein the substance capable of forming the inclusion compound is thiourea, the solvent is 2-methoxyethanol, the feed mixture is comprised of n- and isoparaffins, cycloparaffins, and aromatics, and the aromatics selectively dissolve in the solvent.

References Cited

UNITED STATES PATENTS

| | | | |
|---|---|---|---|
| 2,635,986 | 4/1953 | Hess et al. | 208—25 |
| 2,637,681 | 5/1953 | Arnold et al. | 208—25 |
| 2,653,122 | 9/1953 | Arnold et al. | 208—25 |
| 2,914,455 | 11/1959 | Keller | 208—25 |
| 3,328,313 | 6/1967 | Dellow | 208—25 |
| 3,448,040 | 6/1969 | Little et al. | 208—25 |

HERBERT LEVINE, Primary Examiner

U.S. Cl. X.R.

208—25; 260—96.5